Patented Sept. 3, 1946

2,406,958

UNITED STATES PATENT OFFICE 2,406,958

CHEMICALLY MODIFIED WOOL

David Malcolm McQueen, Newark, Del., assignor to E. I. du Pont de Nemours & Company, Wilmington, Del., a corporation of Delaware No Drawing. Application July 9, 1943, Serial No. 494,075

8 Claims. (Cl. 8—127.6)

This invention relates to chemically modified keratinous materials, particularly wool.

It has been previously known that wool of improved properties can be obtained by a two-step reaction involving splitting of the disulfide linkages in wool by reduction with thioglycolic acid and subsequently introducing new and more stable crosslinks by reaction of the reduced wool with alkylene dihalides.

An object of this invention is the preparation of chemically modified keratinous protein materials of improved properties. Another object is the preparation of chemically modified wool having increased resistance to shrinkage, attack by moths, alkalies, enzymes, bacteria, and the like. A further object is the preparation of a chemically modified wool by a reaction involving only one step. Further objects will appear hereinafter.

These objects are accomplished by reacting a keratinous protein material, particularly wool, with an unsaturated organic compound having a terminal methylene group linked by an ethylenic double bond to carbon, said ethylenic double bond being conjugated through carbon atoms with another multiple bond in the molecule, in an essentially anhydrous inert medium and in the presence of a small amount of a halogen having anatomic weight above 20, preferably iodine. The unsaturated organic compounds can also be designated vinyl or vinylidene compounds in which the terminal ethylenic double bond is conjugated through carbon atoms with another multiple bond in the molecule.

In the preferred procedure wool is reacted with acrylonitrile or styrene in anhydrous ether in the presence of a small amount of iodine as catalyst.

The invention is further illustrated by the following examples in which all parts are expressed by weight.

Example I

A piece of dry wool serge (133 parts) is suspended for 24 hours in a solution containing 6.9 parts of styrene, 1.65 parts of iodine, and 2830 parts of anhydrous ether maintained at a temperature of 30° C. The piece of wool serge is removed from the reaction medium and is washed with water and methanol and is air dried. The treated wool is chemically modified by the styrene to the extent that 42% of the original disulfide crosslinks of natural wool are no longer reactive with thioglycolic acid. This compares with 100% reaction of disulfide crosslinks in untreated wool with thioglycolic acid under the same conditions. The wool serge modified in accordance with the procedure of this example is more resistant to shrinkage and attack by moths and alkali than an untreated sample of the same wool.

Example II

A piece of dry wool serge (80 parts) is suspended for 20 hours in a solution containing 20 parts of acrylonitrile, 1.0 part of iodine and 3540 parts of anhydrous ether maintained at 22-27° C. The piece of wool serge is removed from the reaction medium and is washed with water and methanol and is air dried. The treated wool is chemically modified by acrylonitrile to the extent that 63% of the original disulfide crosslinks of natural wool are no longer reactive with thioglycolic acid. This compares with 100% reaction of the disulfide crosslinks in untreated wool with thioglycolic acid under the same conditions. The wool modified in accordance with the procedure of this example is more resistant to shrinkage and attack by moths and alkalies than untreated wool.

Although this invention is described particularly in terms of wool, other keratinous protein materials can also be modified by this process, for example, feathers, hoofs, horn, nails, animal hairs, human hair, and the like.

In addition to the styrene and acrylonitrile employed in the examples, other vinyl or vinylidene compounds having their ethylenic double bonds conjugated with another multiple bond in the molecule may be employed. These include acrylic and methacrylic acids, esters of acrylic and methacrylic acids, for example ethyl and methyl acrylate and methacrylate; methacrylonitrile, alpha-chloracrylic acid and its alkyl esters, for example, methyl alpha-chloracrylate; methyl vinyl ketone; mono-vinyl acetylene; butadiene, isoprene, chloroprene, and the like.

The ratio of unsaturated compound to wool employed in this reaction falls within the range of from 1 to 64 or more mols unsaturated compound per disulfide linkage of the wool with a ratio of 8 mols unsaturated compound per disulfide linkage being preferred. This is a range of 1 to 64 grams molecular weights of the unsaturated compound per 2060 grams of wool with 8 grams molecular weights per 2060 grams of wool being preferred. In the case of styrene the proportions are 104 to 6650 parts, and preferably 830 parts, of styrene per 2060 parts of wool. In the case of acrylonitrile the proportions are 53 to 3390 parts, and preferably 424 parts, acrylonitrile per 2060 parts of wool. Lower ratios of unsaturated compound produce less modification of the wool than is usually desired whereas higher ratios are not proportionately as effective and are therefore wasteful.

The reaction of the unsaturated compound with wool is carried out in the presence of a halogen having an atomic weight of above 20, that is chlorine, bromine, and iodine, with iodine being the preferred halogen. The ratio of halogen to wool which can be used varies from 0.085 to 0.5 mol halogen per disulfide linkage of the wool and is preferably about 0.125 mol per disulfide linkage. The number of disulfide linkages, on the molar basis, in the wool can be calculated from the per cent of sulfur in the wool on the basis of the group weight of the disulfide linkage as 64. Wool contains, on the average, 3.1% sulfur and this as disulfide linkage sulfur. The amount of wool containing two gram atomic weights of sulfur is $$\frac{64}{3.1} = 100$$

or 2060 grams. For this amount of sulfur there would be employed from 0.085 to 0.5 gram molecular weight of halogen. This would be 6.0 to 35.5 grams of chlorine, 13.6 to 79.9 grams of bromine, or 21.6 to 126.9 grams of iodine. The preferred 0.125 mol per disulfide linkage of the wool is equivalent to 31.7 grams of iodine per 2060 grams of wool.

It is necessary that the reaction be carried out in an essentially anhydrous inert medium, generally liquid. Included in such media are trichloroethylene, chlorethylene, kerosene, anhydrous ether, benzene, toluene, and the like.

The reaction is preferably carried out at room temperature although temperatures up to 100° C. or higher and up to the degradation temperature of the wool may be employed. The higher temperatures are not generally used since they tend to increase the rate of polymerization of the unsaturated compound reacting with the wool. Inhibitors of polymerization of these unsaturated compounds can be used, for example, pyrogallic acid or hydroquinone, to inhibit the polymerization where it interferes with the reaction with the wool.

The reaction of the unsaturated compound with the wool is usually sufficient in 24 hours to produce a satisfactory degree of modification with attendant improvement in properties. In any event the reaction is allowed to proceed until at least 25% of the disulfide crosslinks of the wool are no longer reducible with thioglycolic acid. Shorter times produce a smaller amount of modification whereas the longer periods beyond 36 to 72 hours have little effect in furthering the reaction.

It is believed that in this invention the unsaturated compounds react with the wool at the disulfide linkage to form in a single step more stable thioether crosslinks.

The chemically modified wools prepared in accordance with this invention show improved properties with respect to shrinkage, resistance to moths, alkalies, enzymes, and bacteria and the like. The treated wools, therefore, find application in uses where the above properties are of importance, for example, articles of apparel, blankets, rugs, and the like.

The above description and examples are intended to be illustrative only. Any modification of or variation therefrom which conforms to the spirit of the invention is intended to be included within the scope of the claims.

I claim:

1. A process which comprises reacting wool in an essentially anhydrous inert medium with from 1 to 64 gram molecular weights, per 2060 grams of wool, of a monomeric unsaturated compound having a terminal methylene group linked by an ethylenic double bond to carbon, said double bond being conjugated through carbon atoms with another multiple bond in the molecule, and in the presence of from 21.6 to 126.9 parts, per 2060 parts of wool, of iodine.

2. A process which comprises reacting dry wool in an essentially anhydrous inert liquid medium with from 104 to 6650 parts, per 2060 parts of wool, of styrene in the presence of from 21.6 to 126.9 parts, per 2,060 parts of wool, of iodine.

3. A process which comprises reacting dry wool in an essentially anhydrous inert liquid medium with from 53 to 3390 parts, per 2060 parts of wool, of acrylonitrile in the presence of from 21.6 to 126.9 parts, per 2,060 parts of wool, of iodine.

4. A process which comprises reacting dry wool in essentially anhydrous ether with from 104 to 6650 parts, per 2060 parts of wool, of styrene in the presence of 21.6 to 126.9 parts, of iodine per 2060 parts of wool.

5. A process which comprises reacting dry wool in essentially anhydrous ether with from 53 to 3390 parts, per 2060 parts of wool, of acrylonitrile in the presence of 21.6 to 126.9 parts, of iodine per 2060 parts of wool.

6. A wool of reduced tendency to shrink, being modified by chemical reaction, in the presence of about 31.7 grams, per 2060 grams of wool, of iodine with from 1 to 64 grams molecular weights, per 2060 grams of the wool, of a monomeric unsaturated organic compound having a terminal methylene group linked by an ethylenic double bond to carbon, said double bond being conjugated through carbon atoms with another multiple bond in the molecule.

7. A wool of reduced tendency to shrink, being modified by chemical reaction, in the presence of about 31.7 parts, per 2060 parts of wool, of iodine with from 104 to 6650 parts, per 2060 parts of the wool, of monomeric styrene.

8. A wool of reduced tendency to shrink, being modified by chemical reaction, in the presence of about 31.7 parts, per 2060 parts of wool, of iodine with from 53 to 3390 parts, per 2060 parts of the wool, of monomeric acrylonitrile.

DAVID MALCOLM McQUEEN.

Certificate of Correction

Patent No. 2,406,958. September 3, 1946.

DAVID MALCOLM McQUEEN

It is hereby certified that errors appear in the printed specification of the above numbered patent requiring correction as follows: Column 3, lines 21 and 22, for the equation reading $$\frac{64}{3.1} = 100 \quad \text{read} \quad \frac{64}{3.1} \times 100$$

column 4, line 17, claim 1, before the word "compound" insert *organic*; and that the said Letters Patent should be read with these corrections therein that the same may conform to the record of the case in the Patent Office.

Signed and sealed this 12th day of November, A. D. 1946.

[SEAL]

LESLIE FRAZER,
*First Assistant Commissioner of Patents.*